(12) United States Patent
Barkan et al.

(10) Patent No.: US 8,249,399 B2
(45) Date of Patent: Aug. 21, 2012

(54) OPTICAL CHARACTER RECOGNITION VERIFICATION

(75) Inventors: Ella Barkan, Haifa (IL); Dan Shmuel Chevion, Haifa (IL); Boaz Ophir, Haifa (IL); Doron Tal, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 1009 days.

(21) Appl. No.: 12/211,105

(22) Filed: Sep. 16, 2008

(65) Prior Publication Data

US 2010/0067794 A1 Mar. 18, 2010

(51) Int. Cl.
G06K 9/03 (2006.01)
G06K 9/00 (2006.01)
G06K 9/72 (2006.01)

(52) U.S. Cl. ........ 382/311; 382/181; 382/229; 382/231; 382/309; 382/310

(58) Field of Classification Search .................. 382/311, 382/181, 299, 231, 309, 310
See application file for complete search history.

(56) References Cited

U.S. PATENT DOCUMENTS

| | | | |
|---|---|---|---|
| 5,455,875 A | | 10/1995 | Chevion et al. |
| 5,751,849 A | * | 5/1998 | Ikeda .......................... 382/176 |
| 5,852,685 A | * | 12/1998 | Shepard ....................... 382/311 |
| 6,760,490 B1 | * | 7/2004 | Zlotnick ....................... 382/311 |
| 6,801,660 B1 | * | 10/2004 | Williamson et al. .......... 382/187 |
| 7,027,976 B1 | * | 4/2006 | Sites .............................. 704/10 |
| 7,039,256 B2 | | 5/2006 | Zlotnick et al. |
| 7,260,262 B2 | * | 8/2007 | Arima ........................... 382/189 |
| 7,697,758 B2 | * | 4/2010 | Vincent et al. ................ 382/177 |
| 2002/0196290 A1 | * | 12/2002 | Zlotnick ....................... 345/844 |

FOREIGN PATENT DOCUMENTS

WO WO 2008091675 A1 * 7/2008

OTHER PUBLICATIONS

Taghva, et al. "OCRSpell: an Interactive Spelling Correction System for OCR Errors in Text." IJDAR. 3. (2001): 125-137. Print.*
von Ahn, et al. "reCAPTCHA: Human-Based Character Recognition via Web Security Measures." Science. Sep. 12, 2008: 1465-1468. Print.*

* cited by examiner

Primary Examiner — Michael A Newman
(74) Attorney, Agent, or Firm — Ziv Glazberg (57) ABSTRACT

A method for optical character recognition (OCR) verification, the method includes: receiving a first character image that was obtained from applying an OCR process on a document; wherein the first character image is classified, by the OCR, as being associated with a first character; receiving a first character code of a text; replacing the first character code by the first character image; and evaluating a correctness of the OCR based upon a response of a user to a display of the text first character image.

12 Claims, 6 Drawing Sheets

FIG. 1 receiving a first character image that was obtained from applying an OCR process on an image of a document. The first character image is classified, by the OCR, as being associated with a first character. This classification can also be associated with an OCR certainty level. 210 receiving a first character code of a text. 220 replacing the first character code by the first character image. 230 displaying text that includes the first character image. 240 receiving information relating to a response of the user to the displayed text. 250 evaluating a correctness of the OCR based upon a response of a user to the first character image. 260

OPTICAL CHARACTER RECOGNITION VERIFICATION

FIELD OF THE INVENTION

The present invention relates to systems, methods and computer program products for Optical Character Recognition verification.

BACKGROUND OF THE INVENTION

Virtual machines isolate an operating system from the computer platform that is used to execute the operating system. Operating systems running inside virtual machines can be executed by different computer platforms.

Mass digitization demands the creation of a new digitization paradigm by mobilizing the general public to help with large-scale digitization efforts. One of these projects is known as Project Gutenberg (http://www.pgdp.net/c/). While the bulk of the data is digitized automatically by automated tools (such as servers, computers, scanners and the like) by applying Optical Character Recognition (OCR) techniques, the output of the OCR is not error free. Thus, the main task in this effort is OCR validation and correction. The goal is to make this process productive and attractive to volunteer participation.

The so-called "carpet" OCR verification method includes generating a "carpet" of character images that were classified by the OCR as associated with the same character. Assuming that most OCR classifications are correct, an erroneous character image will be easily noticeable in the "carpet". For example, if the OCR erroneously classifies a "P" as an "A," the operator will see an image of a P in a "carpet" full of A's. This type of discrepancy is very easy for the human operator to spot and mark on the screen. The image of the field that was read erroneously by the OCR is then displayed so that the operator (or another operator) can type in the correct character.

Reading a "Carpet" is not very interesting, thus users of the general public will not be attracted to perform substantial verification efforts. Accordingly, it is less appealing for the massive volunteer efforts needed in library digitization.

Another OCR verification technique that involves validating texts within their original context is also not appealing. Not only does it require custom applications, but understanding the text within its original context is a difficult task in itself: (i) the actual content of different texts may interest only a select group of experts while large scale OCR verification needs to be done by laymen; (ii) the vocabulary can include words which are unfamiliar to the person who performs the OCR verification (e.g. a verification of the OCR results of a Shakespearean play, by a third grader).

When dealing with archaic texts even more problems arise: (a) language evolves through the years—words and meanings change; (b) spelling, even of familiar words, changes over the years.

This process is both intrusive and hard, thus significantly lowering productivity and participation.

There is a growing need to provide an efficient OCR verification method, system and computer program product.

SUMMARY

A method for optical character recognition (OCR) verification, the method includes: receiving a first character image that was obtained from applying an OCR process on a document; wherein the first character image is classified, by the OCR, as being associated with a first character; receiving a first character code of a text; replacing the first character code by the first character image; and evaluating a correctness of the OCR based upon a response of a user to a display of the text first character image.

BRIEF DESCRIPTION OF THE DRAWINGS

The present invention will be understood and appreciated more fully from the following detailed description taken in conjunction with the drawings in which.

DETAILED DESCRIPTION OF THE DRAWINGS

A method, system and computer program product for OCR verification are provided. They add interest to the OCR verification process by implanting character images in text that can be relevant to the user. Such text can be written by the user, read by the user, or a combination thereof. This text differs from the document that was OCR processed to provide the character images. The term "text" includes a combination of characters or information representative of the combination of characters. Text can include displayed text as well as signals that can cause a display controller to display text on a display. For example, text can include a sequence of character codes as well as include the text that is being displayed on a display as a result of the provision of these character codes to a display controller.

Instead of presenting to the user the document to be OCR validated, the results of the OCR processing of that document are inserted in text that was retrieved by the user, written by the user or both. The insertion of character images allows an assimilation of the OCR verification task into the user's routine tasks.

The suggested validation creates minimal disturbance and can be connected almost seamlessly to standard activities such as editing a letter or reading a web page. The validation can almost be viewed as incidental to the normal conduct of the user or as a byproduct of our normal conduct.

Standard fonts that are used in applications such as web browsers, email application, text editors and the like are replaced with images (for example bitmaps) of characters extracted from an image of a document that is being digitized. While the user reads (or writes) text relevant to himself he will be able to verify OCR results of a non-related document. The user can respond to the display of character images in various applications by pointing out character images that seem to be wrong.

Character images extracted from a single document can be inserted in texts provided to one or multiple users. Different users can receive different character images or even the same character images. The former provides better throughput while the other can provide a more resilient OCR verification process.

Figure 1:
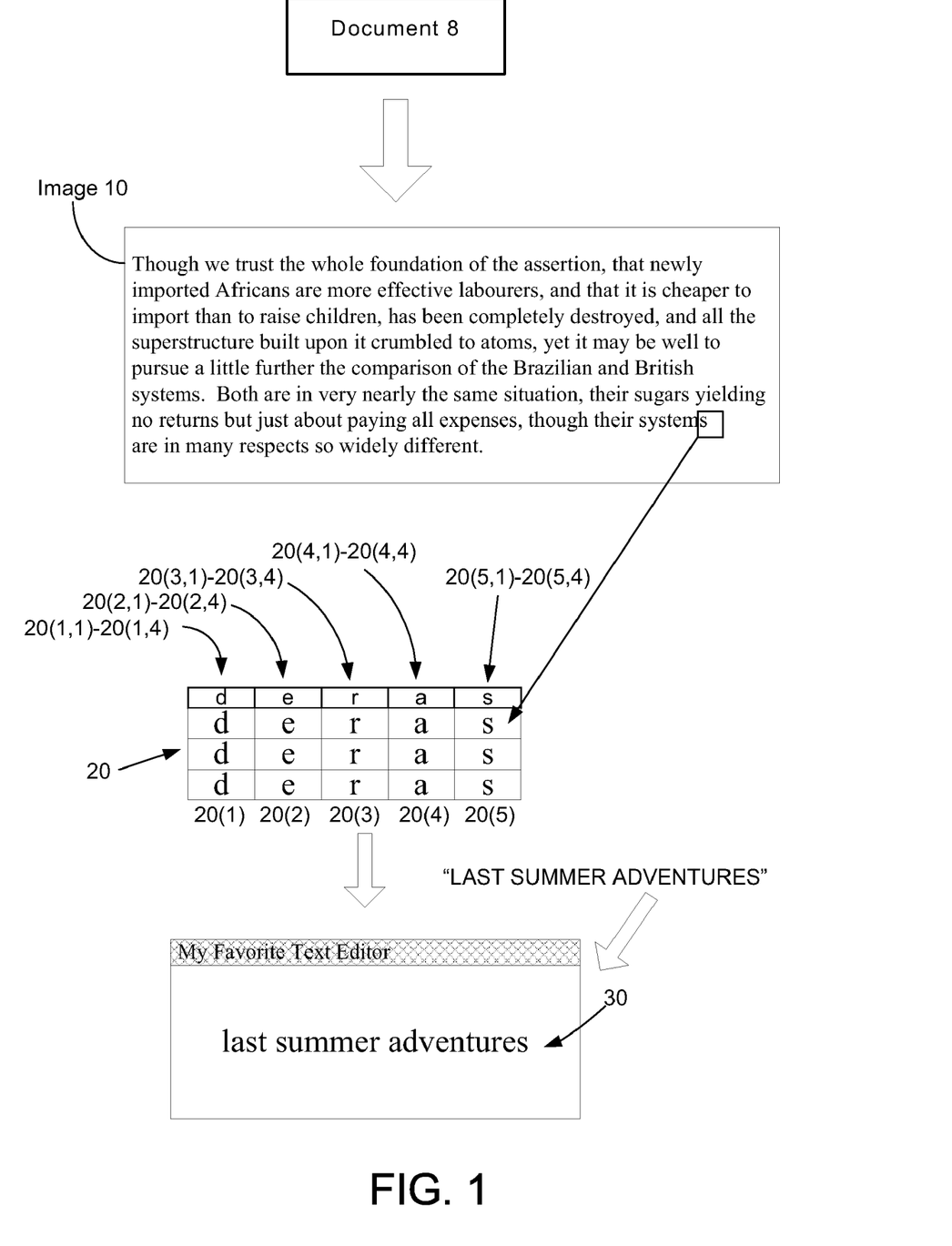
FIG. 1 illustrates a document, an image of the document, character images obtained by applying an OCR on the image of document and text that is displayed on a display, according to an embodiment of the invention.

FIG. 1 illustrates document 8, image 10 of document, character images (collectively denoted 20) obtained by applying an OCR on the image of document 10 and text 30 that is displayed on a display, according to an embodiment of the invention. Keyed-in text "last summer adventure" 30 that originally includes character codes that represent this sequence is modified by replacing these character codes by corresponding character images—as illustrated by text 30 that is displayed on a text editor screen. The term text is used to describe the displayed text as well as to describe the information (character codes, character image information) that represents the displayed text that once provided to a display controller causes a display of text.

Document 8 was OCR processed after image 10 has been acquired. The outcome of the OCR process is multiple OCR results—images of characters and their associated classifications. Each character image is associated with a character code (or with a character) that the OCR process indicates that is being represented by the character image. It is noted that an OCR result can also indicate an OCR classification certainty level that indicates how a certain classification (related to a certain character image) is certain.

FIG. 1 illustrates four groups of character images—group 20(1) associated with the letter "d", group 20(2) associated with the letter "e", group 20(3) associated with the letter "r", group 20(4) associated with the letter "a" and group 20(4) associated with the letter "s". Each group includes four character images—20(1,1)-20(1,4), 20(2,1)-20(2,4), 20(3,1)-20(3,4) and 20(4,1)-20(4,4).

The characters can be sorted to queues or arranged in various manners, some manners differ from the "carpet" format of FIG. 1. The number of different character images can differ from those illustrated in FIG. 1 and usually depends upon the content of the OCR processed document, predefined limitation imposed by the client, and the like. The number of character images per character can differ from character to character but this is not necessarily so.

Figure 2:
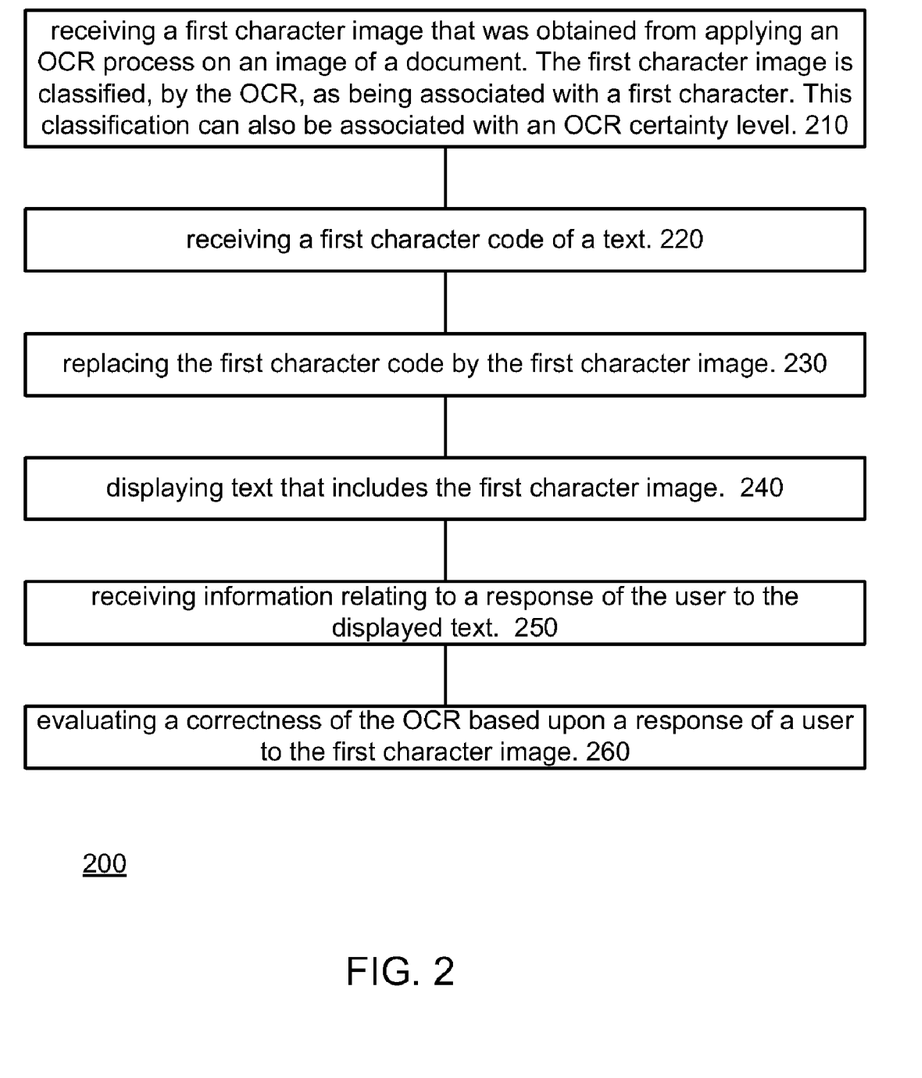
FIG. 2 illustrates a method for OCR verification, according to an embodiment of the invention.

FIG. 2 illustrates method 200 for OCR verification, according to an embodiment of the invention.

Method 200 starts by stage 210 of receiving a first character image that was obtained from applying an OCR process on an image of a document. The first character image is classified, by the OCR, as being associated with a first character. This classification can also be associated with an OCR certainty level.

Stage 210 is followed by stage 220 of receiving a first character code of a text. The text can be written by the user, can be provided from another entity but is being displayed (and probably read by) the user, can appear during a multiple participant exchange of information (for example, during a multiple user game such as Scrabble), and the like. The text can be received while the user executes an application such as but not limited to a browser, a word processor, an email processor, or an instant messaging application. The text includes multiple character codes that represent characters. Stage 220 can include receiving a character code that has been typed by the user or a character code that is included in text that is later being displayed to a user.

Stage 220 is followed by stage 230 of replacing the first character code by the first character image. Especially, replacing the first character code by information (such as a bitmap) that represents the first character image. The replacement modifies the text.

Stage 230 is followed by stage 240 of displaying text that includes the first character image. The first character image can appear one or more times in the displayed text. The text is displayed after being modified in stage 230.

Stage 240 is followed by stage 250 of receiving information relating to a response of the user to the displayed text. The user can request to delete the character image, replace it by another character, replace it by the same character, generate an error indication, and the like. A user can also select not to perform any act in response to the displayed text and this selection can also be indicative of the user response to the displayed text.

Stage 250 is followed by stage 260 of evaluating the correctness of the OCR based upon a response of a user to the first character image. For example, if the user accepted the display text, did not ask to replace the character image by a character code or another character image then it can be presumed that the OCR result is correct.

Figure 3:
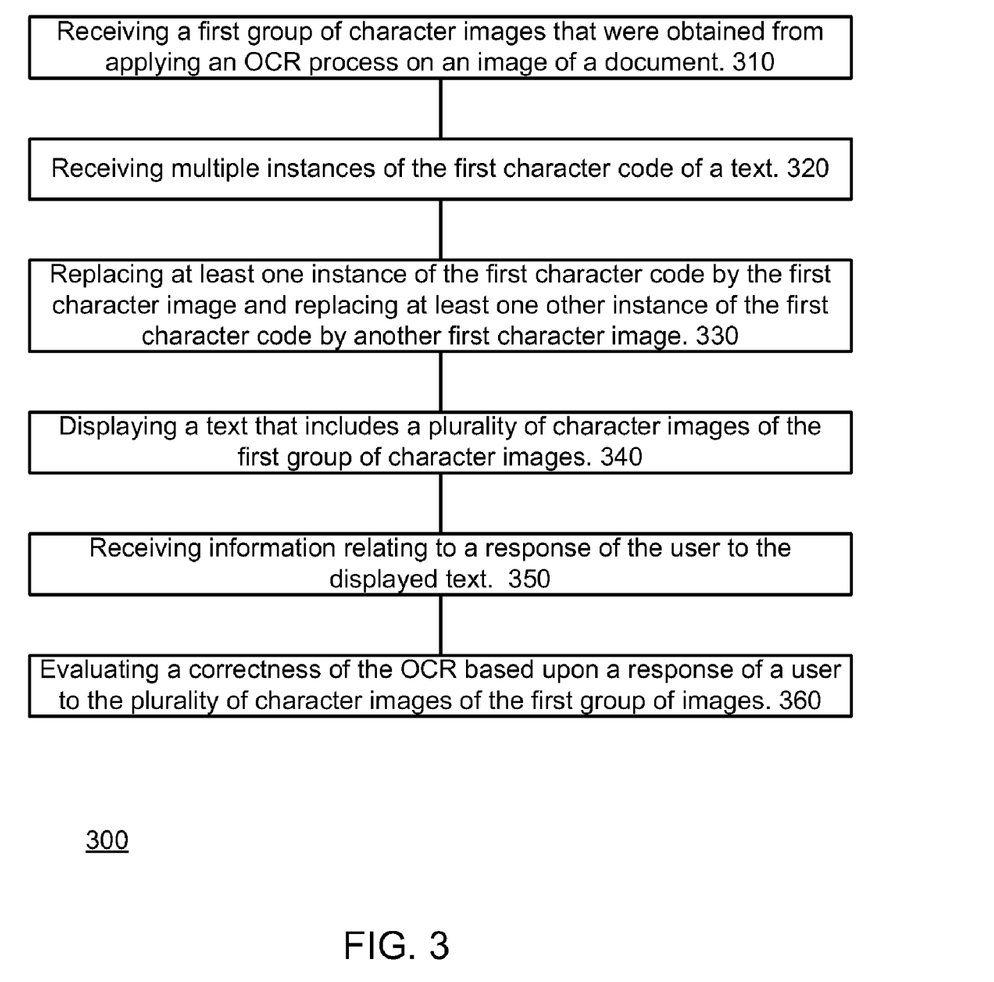
FIG. 3 illustrates a method for OCR verification, according to an embodiment of the invention.

FIG. 3 illustrates method 300 for OCR verification, according to an embodiment of the invention.

Method 300 starts by stage 310 of receiving a first group of character images that were obtained from applying an OCR process on an image of a document. Each character image of the first group of character images is classified, by the OCR, as being associated with the first character. Referring to the example set fourth in FIG. 1, stage 310 can include receiving group 20(1) that includes character images 20(1,1), 20(1,2), 20(1,3) and 20(1,4), all being associated with the letter "d".

Stage 310 is followed by stage 320 of receiving multiple instances of the first character code of a text. The text can be written by the user, can be provided from another entity but is being displayed (and probably read by) the user, can appear during a multiple participant exchange of information (for example during a multiple user game such as Scrabble), and the like.

Stage 320 can include receiving a character code that has been typed by the user or a character code that is included in a document that is later being displayed to a user. Some instances of the first character code can be inserted by the user and some can be provided from another entity. This can result, for example, when the user updates the text or writes only a part of the text.

Stage 320 is followed by stage 330 of replacing at least one instance of the first character code by the first character image and replacing at least one other instance of the first character code by another first character image. Referring to the example of FIG. 1, a first instance of a "d" code can be replaced by character image 20(1,1) while another instance of a "d" code can be replaced by character image 20(1,2). The mapping between the character images and the instances of the character codes can be made in a predetermined manner, in a random manner, in a pseudo-random manner, in response to an OCR certainty level of each first character image, or a combination thereof. For example, a character image that is associated with a lower OCR certainty level can be presented more than another character image (associated with the same character code) that is associated with a higher OCR certainty level.

Yet according to another embodiment of the invention a user tolerability measure is taken into account—it should prevent the display of too many image characters of a low OCR certainty level within the same text, within the same sentence or even within the same word. The user tolerability measure also can also limit the number of replacements of character codes by character images regardless of the OCR certainty level.

Stage 330 is followed by stage 340 of displaying a text that includes a plurality of character images of the first group of character images.

Stage 340 is followed by stage 350 of receiving information relating to a response of the user to the displayed text. The user can request to delete one or more character images, replace one or more character(s) by another character, replace a character image by the same character, generate an error indication, and the like. A user can also select not to perform any act in response to the displayed text and this selection can also be indicative of the user response to the displayed text.

Stage 350 is followed by stage 360 of evaluating a correctness of the OCR based upon a response of a user to the plurality of character images of the first group of images. For example, if the user accepted the display text, did not ask to replace the character image by a character code or another character image then it can be presumed that the OCR result is correct.

Figure 4:
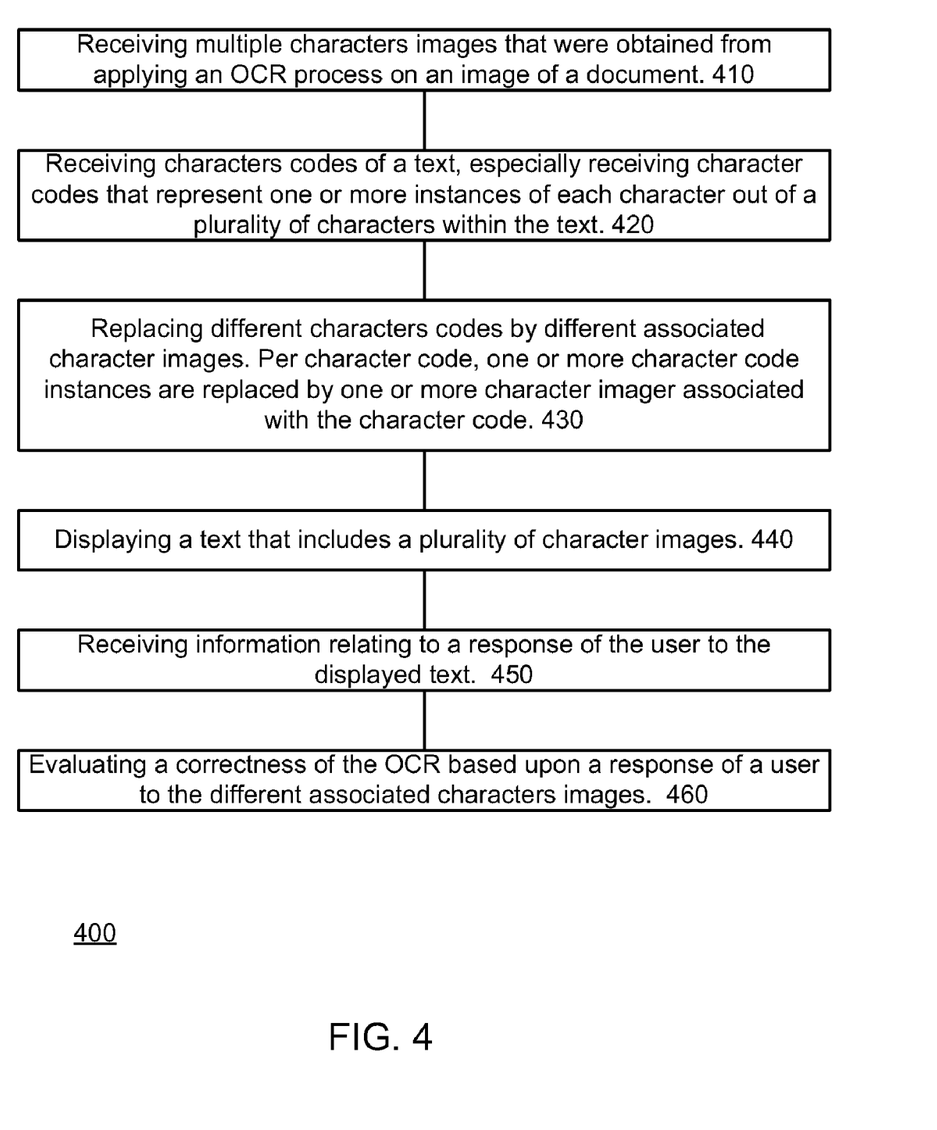
FIG. 4 illustrates a method for OCR verification, according to an embodiment of the invention.

FIG. 4 illustrates method 400 for OCR verification, according to an embodiment of the invention.

While a single iteration of method 200 evaluates a single character image, a single iteration of method 300 evaluates a group of character images associated with a single character, a single iteration of method 400 evaluates multiple character images of a plurality of characters—one or more character images per character. Accordingly, a single iteration of method 400 can be equivalent to multiple iterations of either one of methods 200 and 300. It is further noted that a single document can be OCR verified by multiple users—each receiving a portion of character images that are included in the image of the document.

Method 400 starts by stage 410 of receiving multiple character images that were obtained from applying an OCR process on an image of a document. The multiple characters images are classified, by the OCR, as being associated with a multiple characters. Accordingly, the OCR detected a plurality of characters within the text.

Stage 410 is followed by stage 420 of receiving characters codes of a text, especially receiving character codes that represent one or more instances of each character out of a plurality of characters within the text.

Stage 420 is followed by stage 430 of replacing different characters codes by different associated character images. Per character code, one or more character code instances are replaced by one or more character images associated with the character code. Stage 430 can include replacing all character codes of the text by character code images or replacing only a portion of the character codes of the text by character code images. The replacement can be responsive to one or more OCR certainty levels, a user tolerability measure, and the like.

Stage 430 is followed by stage 440 of displaying a text that includes a plurality of character images.

Stage 440 is followed by stage 450 of receiving information relating to a response of the user to the displayed text.

Stage 450 is followed by stage 460 of evaluating a correctness of the OCR based upon a response of a user to the different associated characters images. Stage 460 can include evaluating the correctness of the OCR based upon an error indication generated by the user in response to the first character image.

According to an embodiment of the invention each method out of methods 200, 300 and 400 can also include a replacement of at least one character code by a reference character image. The reference character image can be a successfully verified character image, a synthetic character image of otherwise a character image of known qualities. It can be an ideal or almost ideal image of the character code or have a higher signal to noise ratio or higher OCR certainty level than the OCR certainty level associated with a character image obtained from the image of the document. Using such a reference character image can provide a more readable displayed text.

Figure 5:
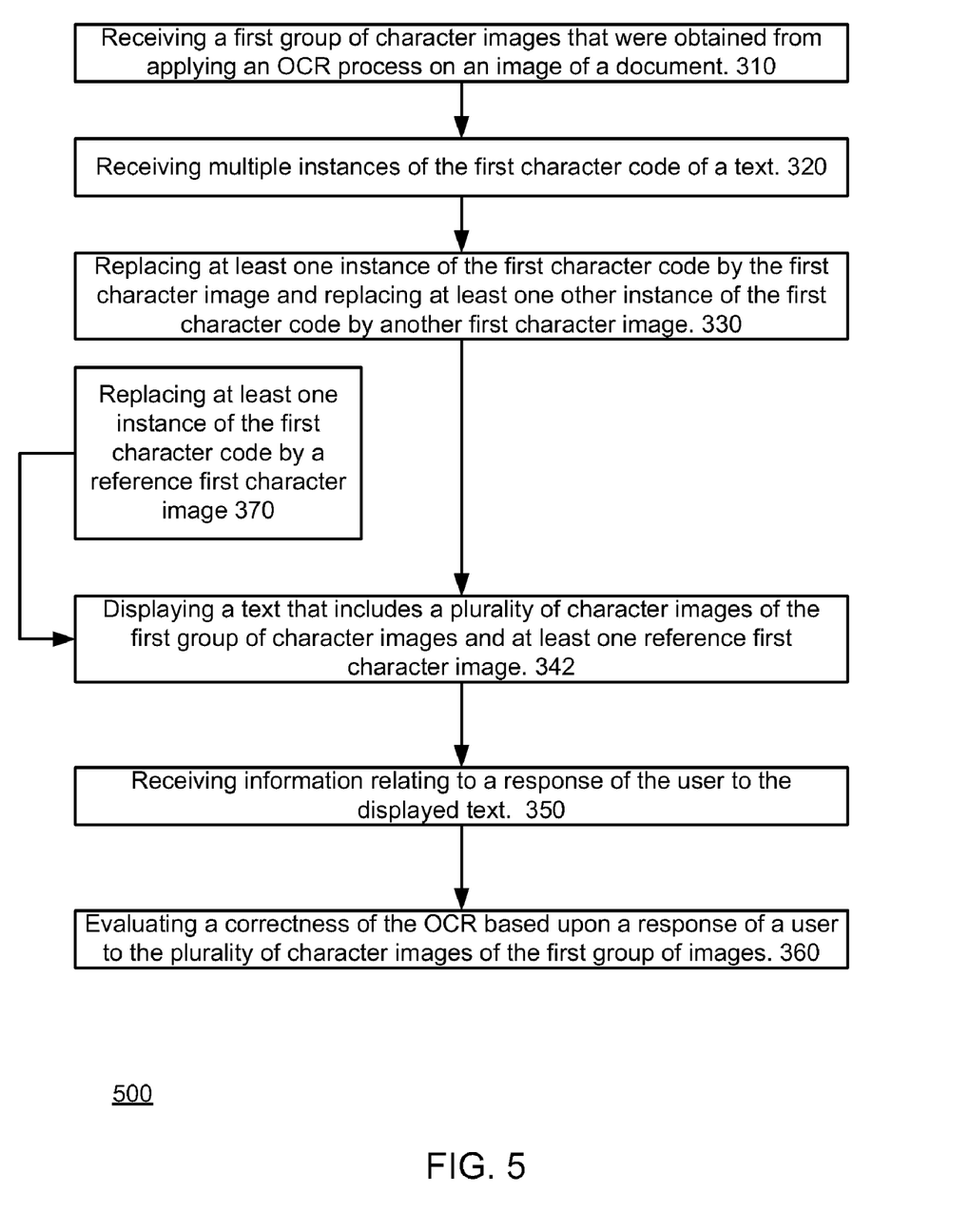
FIG. 5 illustrates a method for OCR verification, according to an embodiment of the invention.

For simplicity of explanation, FIG. 5 illustrates an addition of such stage to method 300. Accordingly, method 500 differs from method 300 by including stage 342 instead of stage 340 and further including stage 370. Stage 370 includes replacing at least one instance of the first character code by a reference first character image. The combination of stage 360 and 330 provides replacing at least one instance of the first character code by the first character image and replacing at least one other instance of the first character code by a reference first character image. Stage 370 and 330 are followed by stage 342 of displaying a text that includes a plurality of character images and at least one reference first character image.

Furthermore, the invention can take the form of a computer program product accessible from a computer-usable or computer-readable medium generating program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can store information that can be read by electronic, magnetic, optical, electromagnetic or infrared based techniques, or semiconductor system (or apparatus or device). Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which generate temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 6:
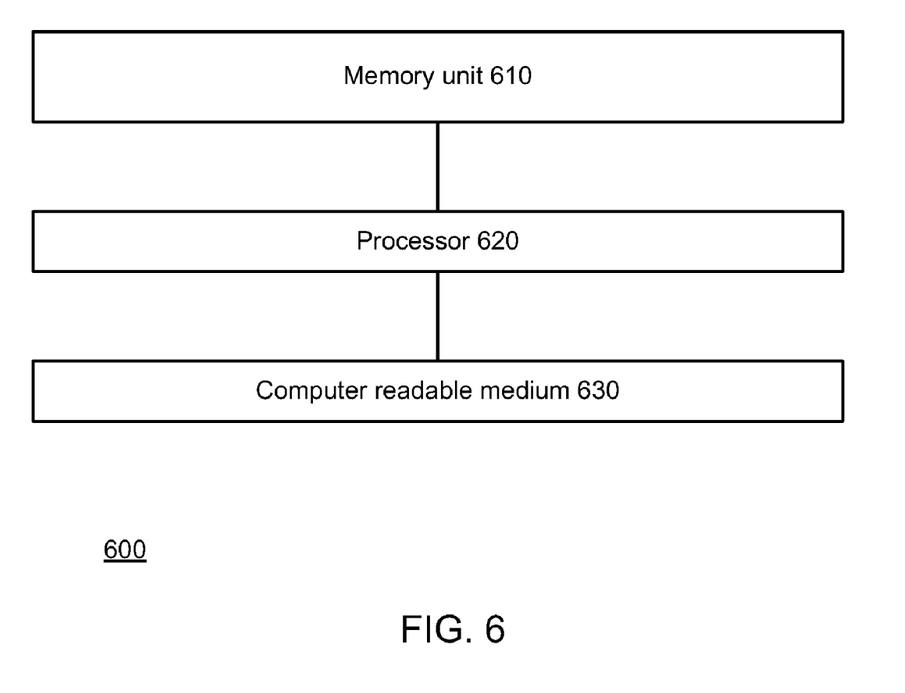
FIG. 6 illustrates a system for OCR verification, according to an embodiment of the invention.

FIG. 6 illustrates system 600 for OCR verification, according to an embodiment of the invention.

System 600 includes memory unit 610 and processor 620. System 60 can be a computer, a server, a desktop computer, a laptop computer, multiple computational entities and the like. It can execute code stored in a computer readable medium 630 that causes system 600 to execute any method out of methods 200, 300, 400 and 500.

Conveniently, a computer program product is provided. It includes a computer usable medium including a computer readable program, wherein the computer readable program when executed on a computer causes the computer to: receive a first character image that was obtained from applying an OCR process on a document; wherein the first character image is classified, by the OCR, as being associated with a first character; receive a first character code of a text; replace the first character code by the first character image; and evaluate a correctness of the OCR based upon a response of a user to the first character image.

The first character code can be entered by the user or provided by an entity that differs from the user.

Conveniently, the computer program product causes the computer to: initiate an application selected from a group consisting of a browser, a word processor, an email processor, and an instant messaging application; and receive, while executing the application, the first character code.

Conveniently, the computer program product causes the computer to receive a first group of character images that were obtained from applying an OCR process on a document; whereas each character image of the first group of character images is classified, by the OCR, as being associated with the first character; replace different instances of the first character code in the text by different members of the first group of character images; and evaluate a correctness of the OCR based upon a response of a user to the different members of the first group of character images.

Conveniently, the computer program product causes the computer to replace at least one instance of the first character code by the first character image and replace at least one other instance of the first character code by a reference first character image.

Conveniently, the computer program product causes the computer to receive multiple character images that were obtained from applying an OCR process on a document; wherein the multiple characters images are classified, by the OCR, as being associated with multiple characters; receive characters codes of a text; replace different characters codes by different associated character images; and evaluate a correctness of the OCR based upon a response of a user to the different associated characters images.

Conveniently, the computer program product causes the computer to replace all character codes of the text by character code images.

Conveniently, the computer program product causes the computer to replace only a portion of the character codes of the text by character code images.

The computer program product according to claim 17 that comprises a computer readable medium that stores code that once executed by the computer causes the computer to evaluate the correctness of the OCR based upon an error indication generated by the user in response to the first character image.

Variations, modifications, and other implementations of what is described herein will occur to those of ordinary skill in the art without departing from the spirit and the scope of the invention as claimed.

Accordingly, the invention is to be defined not by the preceding illustrative description but instead by the spirit and scope of the claims.

We claim:

1. A method for optical character recognition (OCR) verification, the method comprising:
    receiving a first character image obtained during an OCR process applied to a text of a first document by an OCR-capable computer-based software application, wherein the first character image is classified by the OCR-capable computer-based software application as being associated with a first character;
    replacing a first display character of a text of a second document with the first character image,
    wherein the first display character corresponds to the first character that is associated with the first character image,
    wherein the second document is unrelated to the first document, and
    wherein the text of the second document is displayed on a display by a computer-based software application other than the OCR-capable computer-based software application;
    receiving a correctness evaluation of the association of the first character image with the first character, wherein the correctness evaluation is based upon a response of a user to the display of the first character image in place of the first display character of the text of the second document; and
    providing to the OCR-capable computer-based software application the correctness evaluation of the association of the first character image with the first character.

2. The method according to claim 1 wherein the text of the second document is entered by the user.

3. The method according to claim 1 wherein text of the second document is provided by an entity that differs from the user.

4. The method according to claim 1
    wherein the computer-based software application other than the OCR-capable computer-based software application is selected from a group consisting of a browser, a word processor, an email processor, and an instant messaging application.

5. The method according to claim 1 and further comprising:
    receiving a of second character image obtained during the OCR process applied to the text of the first document by the OCR-capable computer-based software application, wherein the second character image is classified by the OCR-capable computer-based software application as being associated with the first character;
    replacing a second display character of the text of the second document with the second character image, wherein the second display character corresponds to the first character that is associated with the second character image;
    receiving a correctness evaluation of the association of the second character image with the first character, wherein the correctness evaluation is based upon a response of the user to the display of the second character image in place of the second display character of the text of the second document; and
    providing to the OCR-capable computer-based software application the correctness evaluation of the association of the second character image with the first character, wherein the first character image and the second character image are simultaneously displayed on the display.

6. The method according to claim 1 and further comprising:
    receiving a second character image obtained during the OCR process applied to the text of the first document by the OCR-capable computer-based software application, wherein the second character image is classified by the OCR-capable computer-based software application as being associated with a second character;
    replacing a second display character of the text of the second document with the second character image, wherein the second display character corresponds to the second character that is associated with the second character image;

receiving a correctness evaluation of the association of the second character image with the second character, wherein the correctness evaluation is based upon a response of the user to the display of the second character image in place of the second display character of the text of the second document; and providing to the OCR-capable computer-based software application the correctness evaluation of the association of the second character image with the second character, wherein the first character image and the second character image are simultaneously displayed on the display.

7. A computer program product for optical character recognition (OCR) verification, the computer program product comprising:

a computer-readable storage medium; and computer-readable program code embodied in the computer-readable storage medium, wherein the computer-readable program code is configured to receive a first character image obtained during an OCR process applied to a text of a first document by an OCR-capable computer-based software application, wherein the first character image is classified by the OCR-capable computer-based software application as being associated with a first character, replace a first display character of a text of a second document with the first character image,
wherein the first display character corresponds to the first character that is associated with the first character image,
wherein the second document is unrelated to the first document, and
wherein the text of the second document is displayed on a display by a computer-based software application other than the OCR-capable computer-based software application, receive a correctness evaluation of the association of the first character image with the first character, wherein the correctness evaluation is based upon a response of a user to the display of the first character image in place of the first display character of the text of the second document, and provide to the OCR-capable computer-based software application the correctness evaluation of the association of the first character image with the first character.

8. The computer program product according to claim 7 wherein the text of the second document is entered by the user.

9. The computer program product according to claim 7 wherein text of the second document is provided by an entity that differs from the user.

10. The computer program product according to claim 7 wherein the computer-based software application other than the OCR-capable computer-based software application is selected from a group consisting of a browser, a word processor, an email processor, and an instant messaging application.

11. The computer program product according to claim 7 wherein the computer-readable program code is configured to receive a second character image obtained during the OCR process applied to the text of the first document by the OCR-capable computer-based software application, wherein the second character image is classified by the OCR-capable computer-based software application as being associated with the first character, replace a second display character of the text of the second document with the second character image, wherein the second display character corresponds to the first character that is associated with the second character image, receive a correctness evaluation of the association of the second character image with the first character, wherein the correctness evaluation is based upon a response of the user to the display of the second character image in place of the second display character of the text of the second document, and provide to the OCR-capable computer-based software application the correctness evaluation of the association of the second character image with the first character, wherein the first character image and the second character image are simultaneously displayed on the display.

12. The computer program product according to claim 7 wherein the computer-readable program code is configured to receive a second character image obtained during the OCR process applied to the text of the first document by the OCR-capable computer-based software application, wherein the second character image is classified by the OCR-capable computer-based software application as being associated with a second character, replace a second display character of the text of the second document with the second character image, wherein the second display character corresponds to the second character that is associated with the second character image, receive a correctness evaluation of the association of the second character image with the second character, wherein the correctness evaluation is based upon a response of the user to the display of the second character image in place of the second display character of the text of the second document, and provide to the OCR-capable computer-based software application the correctness evaluation of the association of the second character image with the second character, wherein the first character image and the second character image are simultaneously displayed on the display.

* * * * *